US006557379B1

(12) United States Patent
Nagasawa et al.

(10) Patent No.: US 6,557,379 B1
(45) Date of Patent: May 6, 2003

(54) METHOD OF PRODUCING AN ARC TUBE

(75) Inventors: Masakazu Nagasawa, Shizuoka (JP); Masayuki Umehara, Shizuoka (JP); Hiroshi Goto, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 269 days.

(21) Appl. No.: 09/698,212

(22) Filed: Oct. 30, 2000

(30) Foreign Application Priority Data

Oct. 28, 1999 (JP) .......................................... 11-307816

(51) Int. Cl.[7] .............................................. C03B 23/07
(52) U.S. Cl. ........................... 65/29.12; 65/57; 65/109; 65/110
(58) Field of Search ........................... 65/34, 57, 59.27, 65/29.1, 29.11, 29.12, 29.18, 108, 109, 110

(56) References Cited

U.S. PATENT DOCUMENTS

| 3,263,852 A | * | 8/1966 | Fridrich ................... 220/2.1 R |
| 3,486,875 A | * | 12/1969 | Pymm ......................... 65/110 |
| 3,556,758 A | * | 1/1971 | Andrews et al. ......... 264/209.2 |
| 3,679,385 A | * | 7/1972 | Senft ........................... 65/109 |
| 3,977,856 A | * | 8/1976 | Rosen ........................ 356/521 |
| 4,309,169 A | * | 1/1982 | Petro ............................ 432/64 |
| 4,389,201 A | * | 6/1983 | Hansler et al. ................ 445/26 |
| 4,600,424 A | * | 7/1986 | Flaming ....................... 65/108 |
| 5,108,331 A | * | 4/1992 | Shimada et al. .............. 445/22 |
| 5,936,349 A |   | 8/1999 | Fukai et al. ................. 313/623 |

FOREIGN PATENT DOCUMENTS

JP          1-219031         * 9/1989

* cited by examiner

Primary Examiner—Sean Vincent
(74) Attorney, Agent, or Firm—Sughrue Mion, PLLC

(57) ABSTRACT

A pair of chucks, which grip end portions of a cylindrical glass tube blank, are moved by a chuck moving mechanism toward each other, so that softened glass in an intermediate portion of the cylindrical glass tube blank is gathered, thereby forming a shape that is suitable for blow molding a light emitting tube portion. In the approaching movement, the position of one chuck is detected by using a laser position detector, and a result of the detection is fed back to the chuck moving mechanism, so as to control the approach distances of the chucks. The laser position detector detects the position of the chuck itself. Therefore, even when the positional relationship between the chuck and the chuck moving mechanism is varied, or backlash or deformation occurs in the chuck moving mechanism, the correct position of the chuck still is detected irrespective of such variation, backlash or deformation. Consequently, it is possible to effectively prevent the approach distances of the chucks from deviating from a desired value.

5 Claims, 7 Drawing Sheets

METHOD OF PRODUCING AN ARC TUBE

BACKGROUND OF THE INVENTION

1. Field of the Invention

The present invention relates to a method of producing an arc tube which is used as a light source of a vehicle headlamp or the like, and more particularly to a method of forming a light emitting tube portion in an intermediate portion of a cylindrical glass tube blank.

2. Description of the Related Art

Since an arc tube can perform bright irradiation, it has recently been used as a light source for a vehicle headlamp or the like.

FIG. 5 shows a typical arc tube as used in, for example, a vehicle headlamp. The arc tube includes an arc tube body 4 made of quartz glass, and a pair of electrode assemblies 6A and 6B. In the arc tube body 4, pinch seals 4$b$1 and 4$b$2 are formed on opposite sides of a light emitting tube portion 4$a$ having a substantially elliptical spherical shape, wherein the light emitting tube portion 4$a$ forms a discharge space 2. The electrode assemblies 6A, 6B are pinch-sealed to the pinch seals 4$b$1 and 4$b$2 so that their tip ends are protruded into the discharge space 2.

In a process of producing such an arc tube, first, the light emitting tube portion 4$a$ is formed in an intermediate portion of a cylindrical glass tube blank. The formation of the light emitting tube portion 4$a$ is conducted by the steps shown in FIG. 6, and is described below.

As shown in FIGS. 6($a$) and ($b$), a cylindrical glass tube blank G is rotated about its axis Ax while end portions of the cylindrical glass tube blank G are gripped by chucks 12A and 12B. As the cylindrical glass tube blank G is rotated, an intermediate portion A thereof is heated by burners 14 so as to be softened. As the cylindrical glass tube blank G is rotated, and heated, the chucks 12A and 12B are moved a predetermined distance toward each other, thereby gathering softened glass in the intermediate portion A so as to form an intermediate portion B. Thereafter, as shown in FIG. 6($c$), a split mold 16 is pressed against opposite sides of the intermediate portion B of the cylindrical glass tube blank G. Under this state, blow molding is conducted by blowing a gas into the cylindrical glass tube blank G, thereby forming the intermediate portion B into a substantially elliptical spherical shape.

Conventionally, as shown in FIG. 7, a chuck moving mechanism is used to cause the chucks 12A and 12B to approach one another in the process of forming a light emitting tube portion.

As illustrated, the chuck moving mechanism 120 includes a chuck supporting mechanism 122 and a chuck pressing mechanism 124.

In the chuck supporting mechanism 122, the chucks 12A and 12B are supported by a guide rod 126 so as to be slidable in the direction of the cylindrical glass tube blank's axis Ax, and the chucks 12A and 12B can be moved in opposite directions by an interlocking mechanism which is not shown.

On the other hand, the chuck pressing mechanism 124 includes a stepping motor 128, a screw feeding mechanism 130, and a pressing block 132. The pressing block 132 is fixed to a movable portion 130$a$ of the screw feeding mechanism 130, and is driven by the stepping motor 128 to be moved in the direction of the axis Ax.

A roller 136 is attached via a bracket 134 to one of the chucks 12A and 12B, for example chuck 12A. The pressing block 132 abuts against the roller 136 to press the roller 136. This pressing operation causes the chuck 12A to be moved toward the other chuck 12B along the axis Ax. At this time, the chuck 12B also is moved, by the interlocking mechanism, toward the chuck 12A in an interlocked manner with the movement of chuck 12A.

In the process of forming a light emitting tube portion, the shape of the intermediate portion B is a factor which largely determines the thickness and the inner face shape of the light emitting tube portion 4$a$—i.e., the size and the shape of the discharge space 2—that is to be formed in the subsequent blow molding. In order to accurately form the light emitting tube portion 4$a$ to enhance the optical quality of the arc tube, therefore, it is very important for the chuck moving mechanism 120 to correctly control the approach movement, including distance, of the chucks 12A and 12B.

In the conventional process of forming a light emitting tube portion, the approaching movement of the chucks 12A and 12B in the gathering operation is controlled in accordance with the number of pulses which are sent from a controller to the stepping motor 128 in the chuck pressing mechanism 124. Consequently, a problem arises in that the approaching movement of the chucks 12A and 12B is deviated from that desired by, for example, variation in the positional relationship between the pressing block 132 of the chuck pressing mechanism 124 and the roller 136 of the chuck 12A, deformation of the bracket 134, deformation of the roller 136, or backlash of the screw feeding mechanism 130, and the like.

To account for variation in the approaching movement, a method may be employed in which the position of the pressing block 132 is detected during the gathering operation and a result of the detection is fed back to the controller for the stepping motor 128. Even when this method is employed, however, it is impossible to eliminate error caused by variation in the positional relationship between the pressing block 132 and the roller 136, or deformation of the bracket 134, deformation of the roller 136, and the like.

SUMMARY OF THE INVENTION

The present invention has been conceived in view of the above-described circumstances. It is an object of the invention to provide a method of producing an arc tube in which, in a process of forming a light emitting tube portion in an intermediate portion of a cylindrical glass tube blank, the light emitting tube portion can be accurately formed.

In the present invention, a method of controlling the approach movement of a chuck in a gathering operation is improved so as to attain the above and other objects and advantages.

The method of the present invention is a method of producing an arc tube in which, in a process of producing an arc tube including a light emitting tube portion having a substantially elliptical spherical shape, the light emitting tube portion is formed in an intermediate portion of a cylindrical glass tube blank, and the method includes:

rotating the cylindrical glass tube blank while gripping end portions of the cylindrical glass tube blank with chucks;

heating a vicinity of the intermediate portion of the cylindrical glass tube blank to soften the intermediate portion;

moving the chucks, by a chuck moving mechanism, a predetermined distance toward each other, thereby gathering softened glass in the intermediate portion; and expanding the intermediate portion by blow molding into a substantially elliptical spherical shape, wherein the step of moving the chucks further includes detecting a position of at least one of the chucks by using a position detector, and the method further includes feeding a result of the detection back to the chuck moving mechanism to control an approach distance of the chucks.

The specific configuration of the above-mentioned "position detector" is not particularly restricted as long as it can detect the position of at least one of the chucks. In order to enhance the detection accuracy, however, it is preferable to use a non-contact position detector such as a laser position detector, an electrostatic capacitance type position detector, an image sensor, or a linear encoder.

As described above, according to the invention, in the process of forming a light emitting tube portion in an intermediate portion of a cylindrical glass tube blank, the pair of chucks gripping the end portions of the cylindrical glass tube blank are moved—by the chuck moving mechanism—so as to approach each other, thereby performing the gathering operation. In this case, the position of at least one of the chucks is detected by using the position detector, and a result of the detection is fed back to the chuck moving mechanism, so that the approach movement of the chucks is controlled. Therefore, the method can attain the following effects.

The position detector detects the position of the chuck itself. Therefore, even when the positional relationship between the chuck and the chuck moving mechanism is varied, or backlash or deformation occurs in the chuck moving mechanism, the correct position of the chuck is fed back to the chuck moving mechanism irrespective of such variation, backlash, or deformation. According to this configuration, it is possible effectively to prevent the approach distance of the chucks from deviating from a desired value.

The position of both chucks maybe detected and, in this case, it is possible further to effectively prevent the approach distance of the chucks from being deviated from a desired value. That is, in this case, a higher accuracy is attained than that attained by detecting the position of only one chuck.

As described above, according to the invention, in the process of forming a light emitting tube portion in an intermediate portion of a cylindrical glass tube blank, the light emitting tube portion is accurately formed. Therefore, the optical quality of an arc tube is enhanced.

The specific configuration of the above-mentioned "chuck moving mechanism" is not particularly restricted. However, when the chuck moving mechanism is configured by: a rotary belt having opposed moving portions on which the chucks are respectively fixedly supported; and a chuck pressing mechanism presses one of the chucks that is fixedly supported to the belt, the other chuck is moved in the opposite direction because it is interlocked with the movement of the one chuck. Therefore, the chucks are moved by the same distance in a direction toward, and away from, each other.

When the belt is loosened, the approach movement of each chuck is not equal to that of the other. Therefore, it is important to prevent, as far as possible, the belt from being loosened. When a metal belt is used, elongation of the belt due to changes with age can be made much smaller than that in the case where a timing belt made of rubber or the like is used. Hence, occurrence of loosening of the belt can be effectively suppressed by use of a metal belt.

The gathering operation must be gradually performed in order to prevent the intermediate portion of the cylindrical glass tube blank from being deformed unevenly. Therefore, it is preferable to perform the approaching movement of the chucks in a stepwise manner with a plurality of stations. When such a configuration is employed, detection of an initial position of the chuck may be performed during a period from when the rotary belt mechanism moves to a new station, until a start of the pressing operation by the chuck pressing mechanism in that station. In this case, the approach distance of the chucks can be controlled by detecting the position of the chuck before the chuck is moved by the chuck pressing mechanism, and setting this position as a reference. Even when the approach movement of the chucks is performed in a stepwise manner by a plurality of stations, therefore, it is possible to effectively prevent the approach distance of the chucks from deviating from a desired value.

BRIEF DESCRIPTION OF THE DRAWINGS

The above and other objects and advantages of the present invention will become more apparent by describing in detail preferred embodiments thereof with reference to the accompanying drawings, wherein like reference numerals designate like or corresponding parts throughout the several views, and wherein.

DETAILED DESCRIPTION OF THE PREFERRED EMBODIMENTS

Hereinafter, embodiments of the invention will be described with reference to the accompanying drawings.

Figure 1:
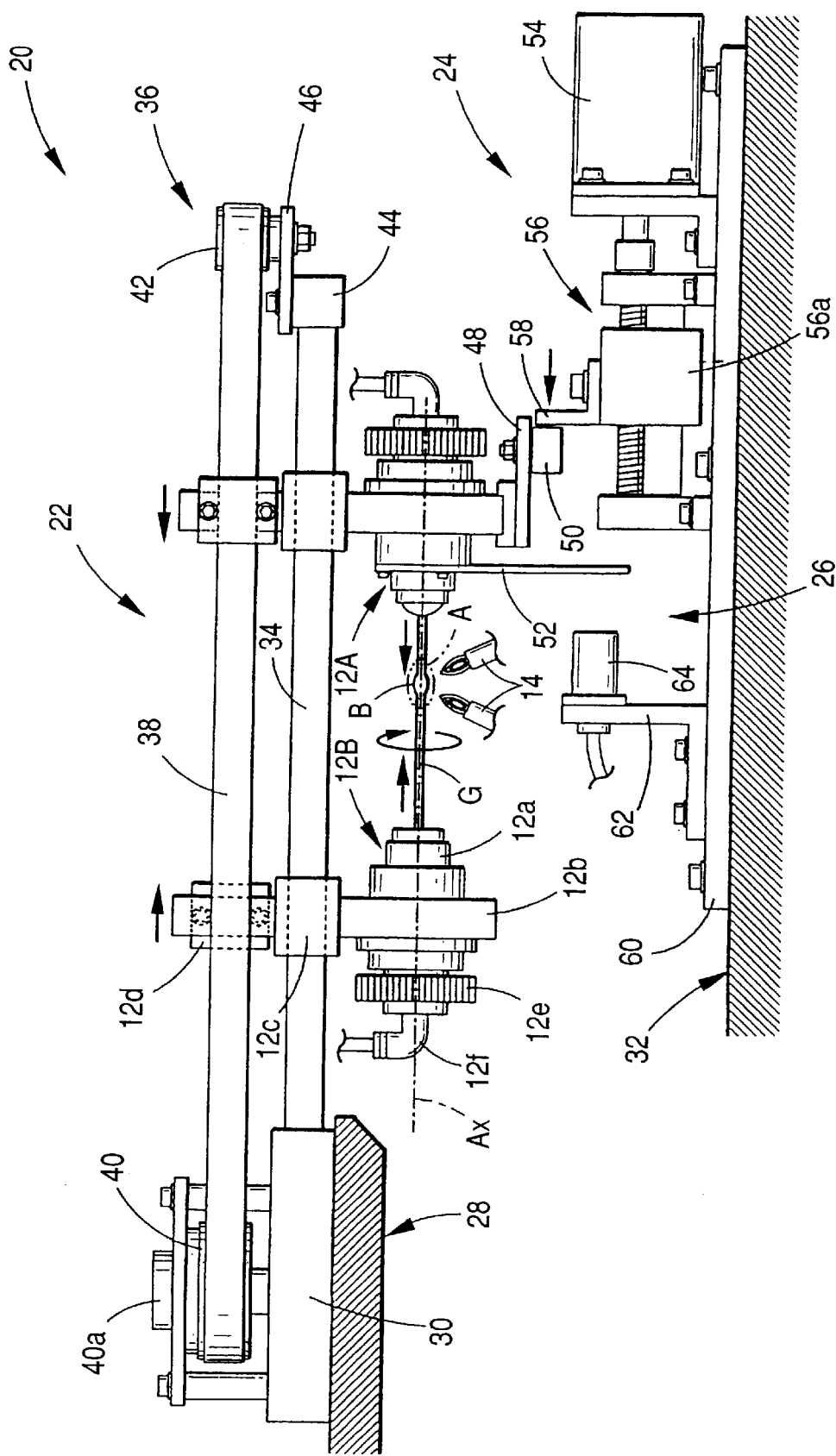
FIG. 1 is a side view showing a chuck moving mechanism which is used in a method of producing an arc tube according to an embodiment of the present invention.
Figure 2:
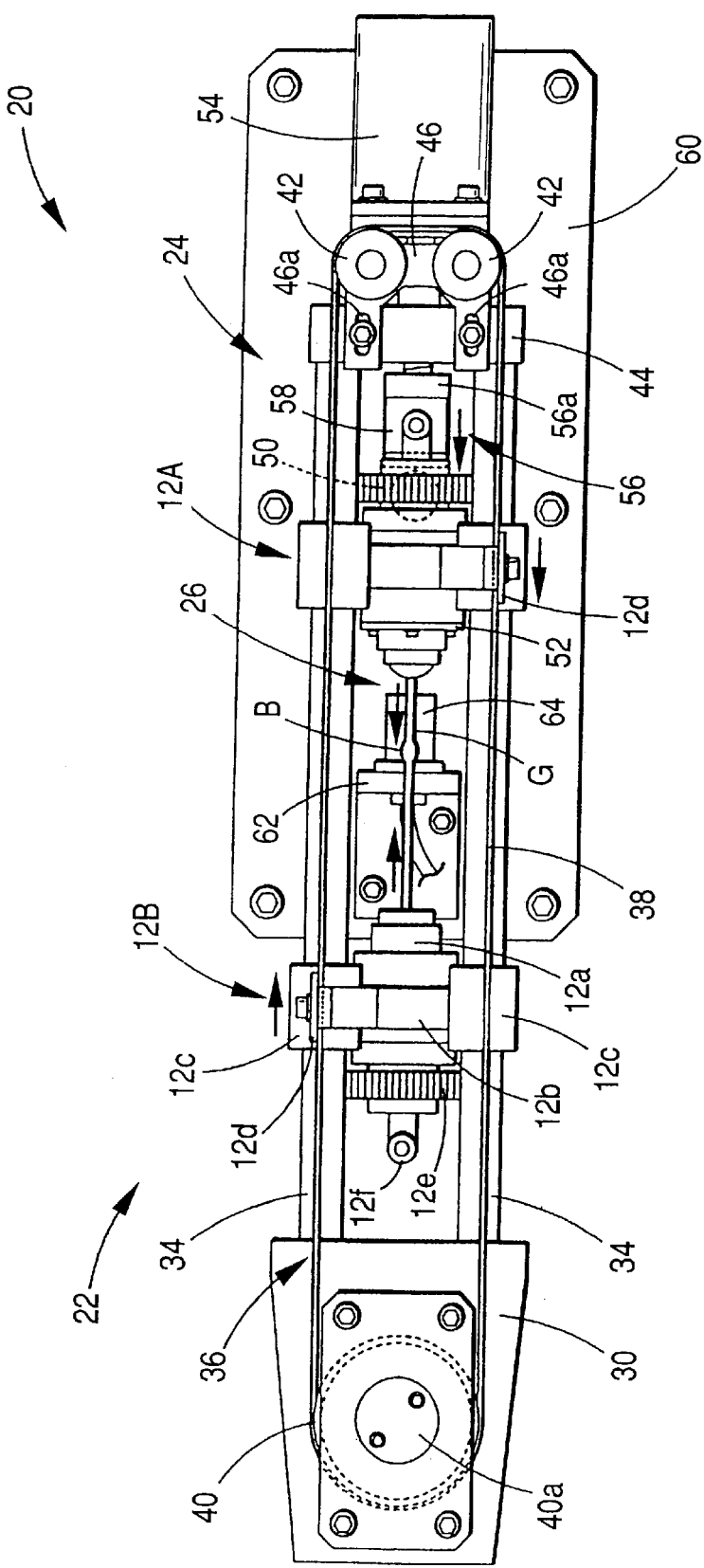
FIG. 2 is a plan view showing the chuck moving mechanism of FIG. 1.
Figure 3:
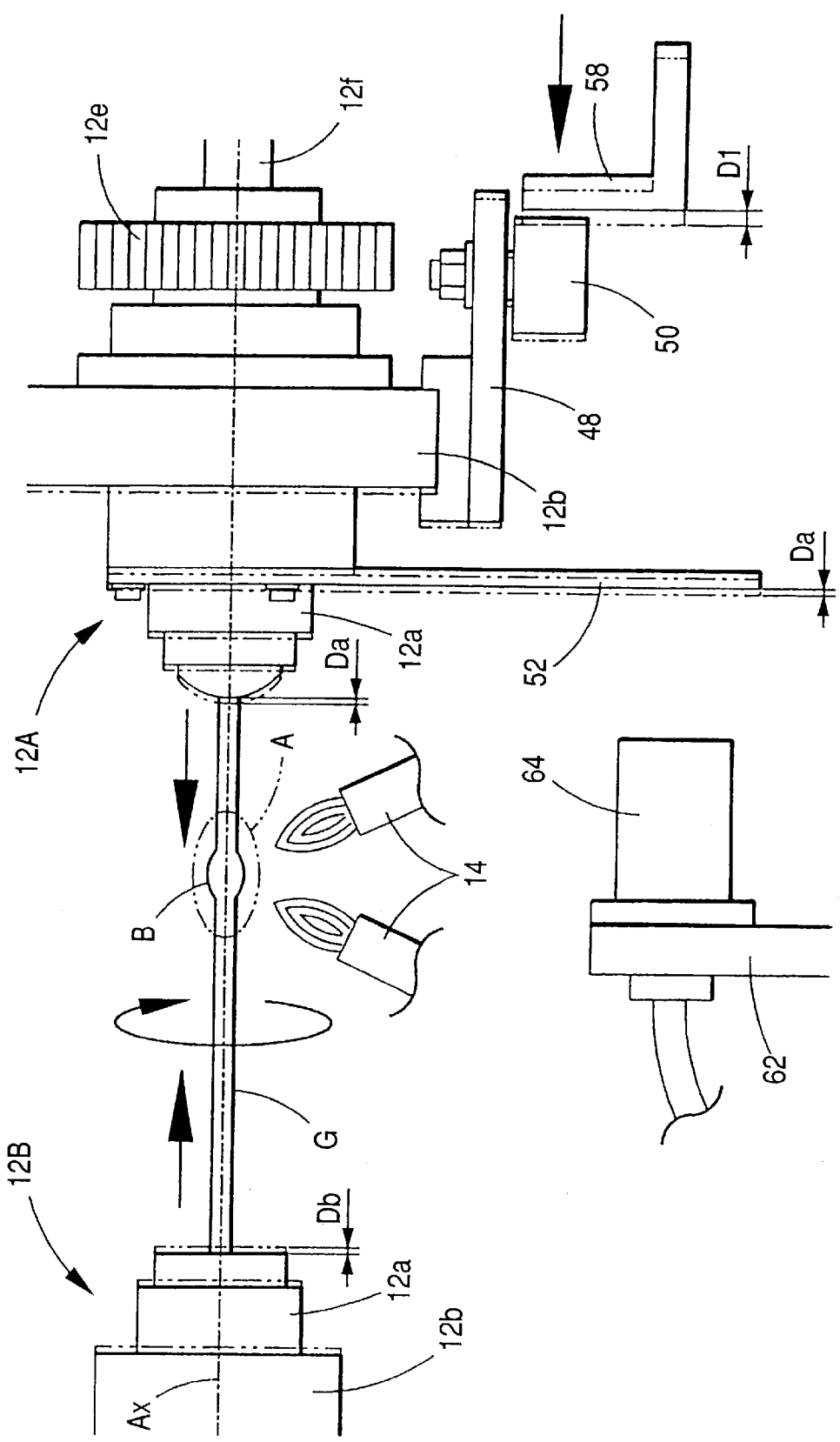
FIG. 3 is a detail view showing main portions of FIG. 1.

FIGS. 1 and 2 are, respectively, side and plan views showing a chuck moving mechanism 20 which is used in a method of producing an arc tube according to an embodiment of the present invention. FIG. 3 is a detail view showing main portions of FIG. 1, and FIG. 4 is a plan view showing a part of an arc tube producing apparatus into which chuck moving mechanisms 20 are incorporated.

Figure 5:
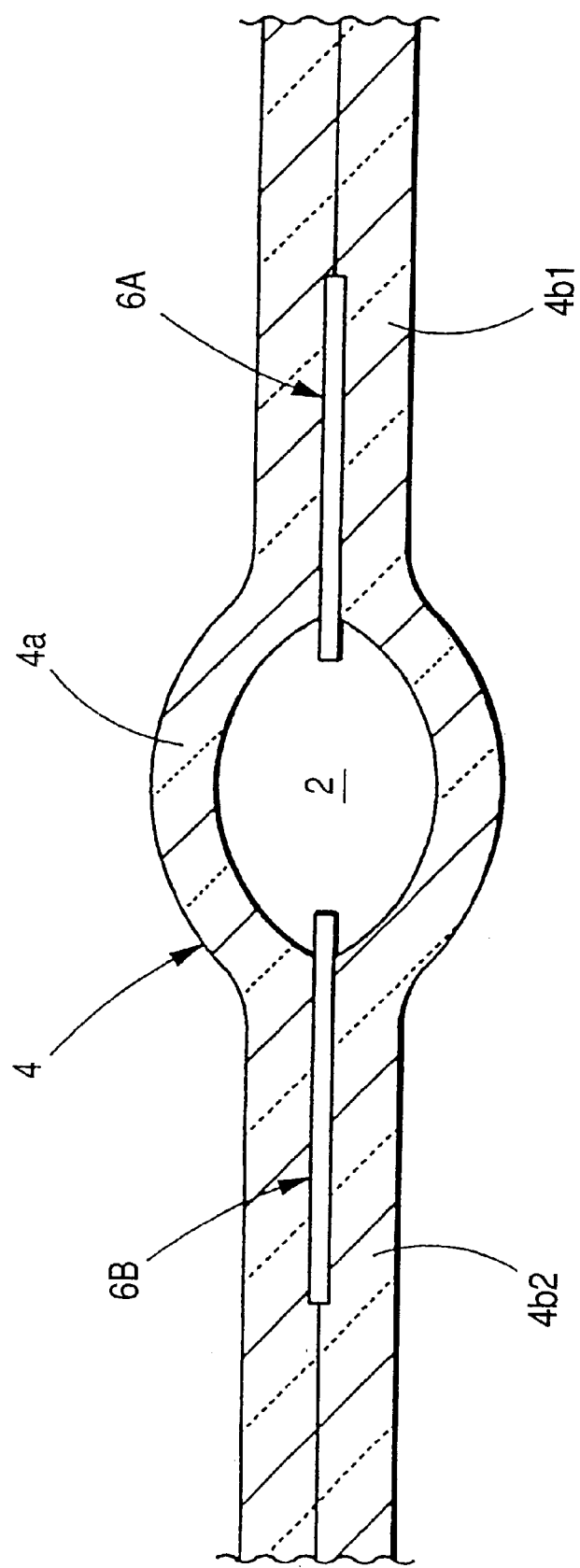
FIG. 5 is a side section view showing an arc tube which is produced by the production method of the present invention.
Figure 6:
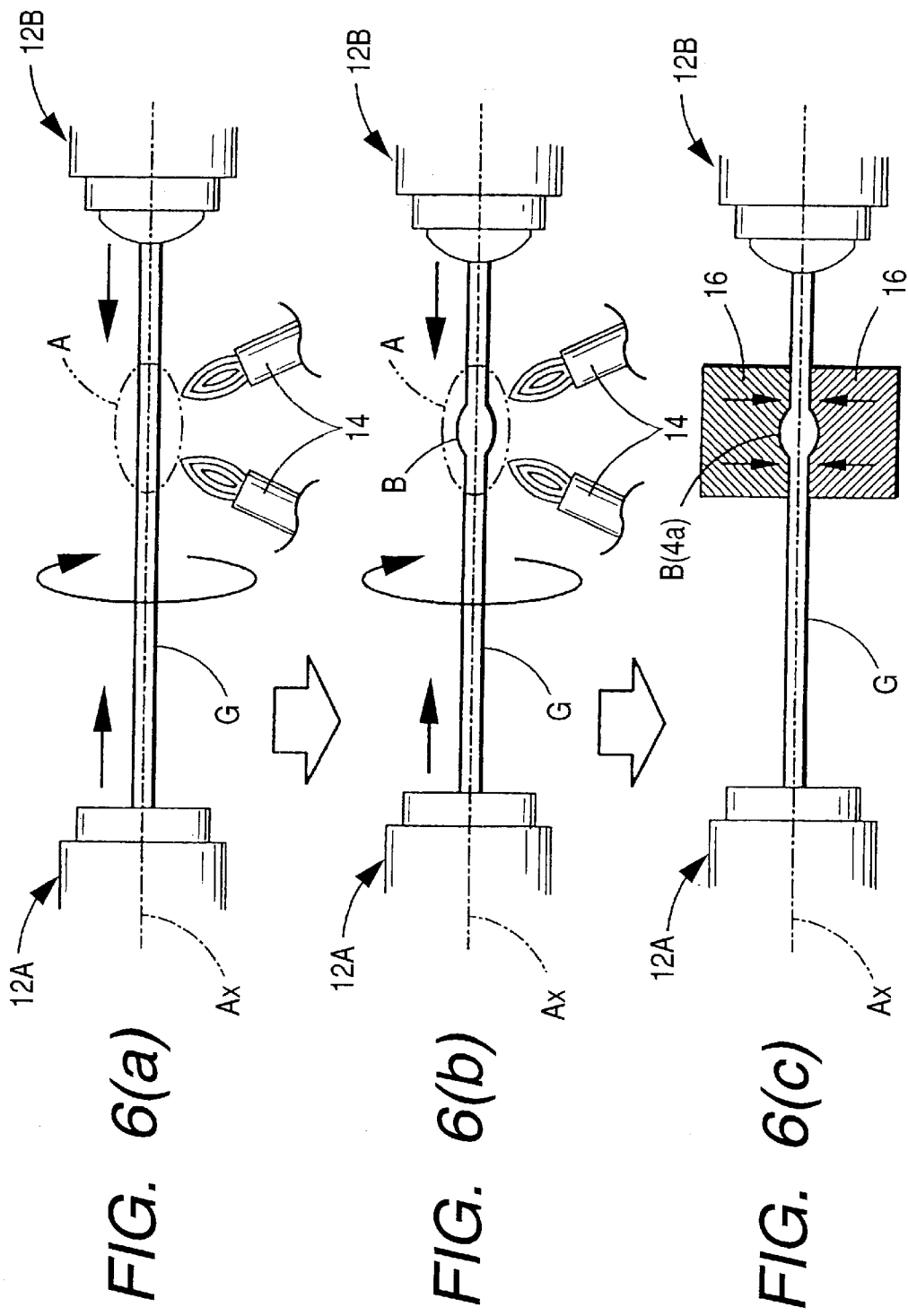
FIGS. 6(a) to 6(c) are views showing, generally, a process of forming a light emitting tube portion for a process of producing an arc tube.
Figure 7:
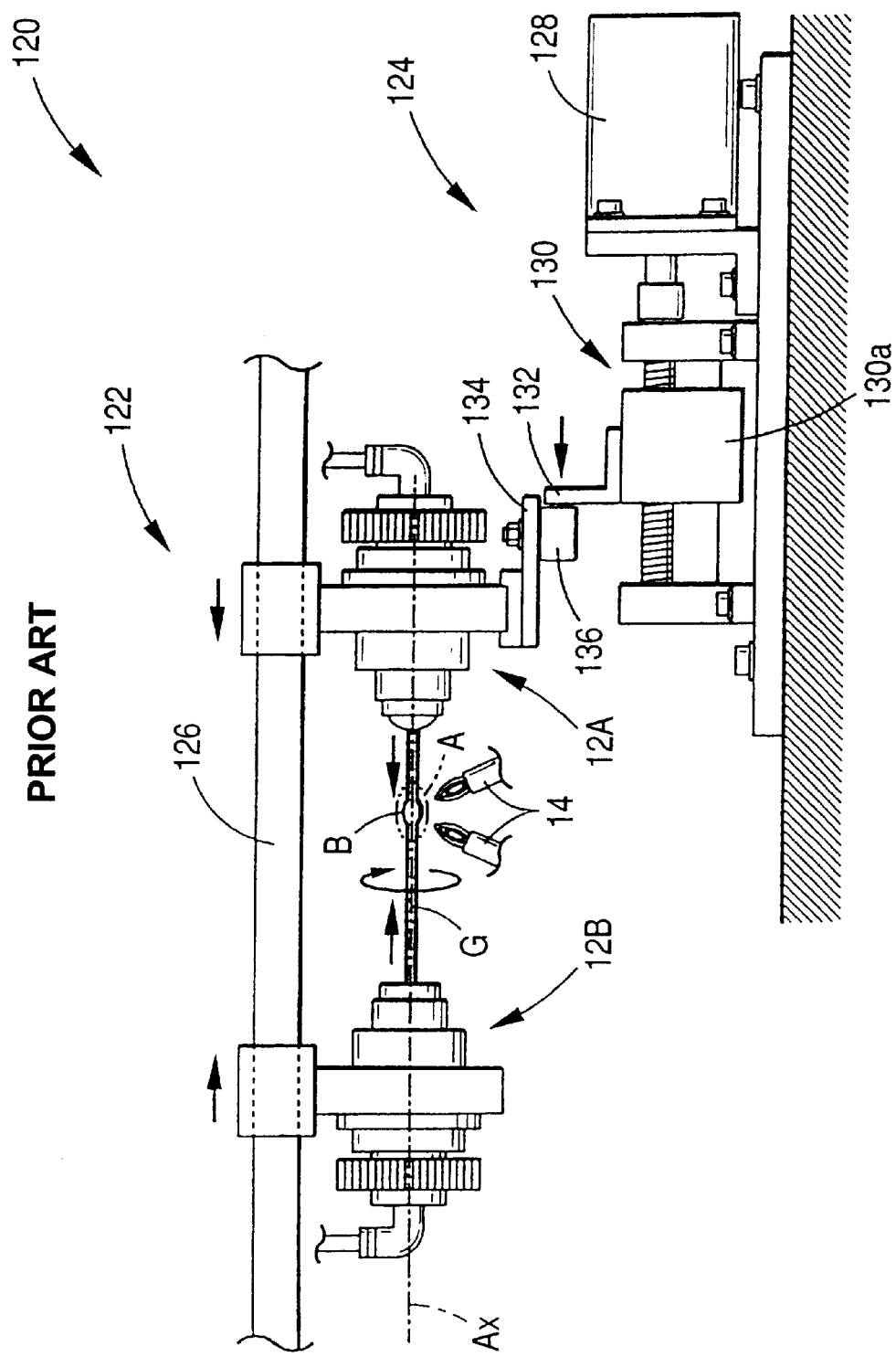
FIG. 7 is a side view showing an example of the conventional-art chuck moving mechanism.

FIG. 5 is a side section view showing an arc tube which is produced by the production method of the present invention, and FIG. 6 is a view showing a process of forming a light emitting tube portion for a process of producing an arc tube. The configuration of the arc tube and the general outline of the process of forming a light emitting tube portion are identical with those which have been described above in the paragraph entitled "Related Art" and, therefore, a detailed description thereof is omitted from the description of this embodiment.

As shown in FIGS. 1 and 3, the chuck moving mechanism 20 is used in the method of producing an arc tube according to one embodiment of the present invention and, more particularly, is a mechanism which is used in the process of forming a light emitting tube portion by gathering glass in the intermediate portion A of the cylindrical glass tube blank G—which blank G is heated by the burners 14 so as to be softened—so as to form the intermediate portion B. The chuck moving mechanism 20 includes a pair of chucks 12A and 12B which grip end portions of the cylindrical glass tube blank G, and which are moved by a predetermined distance in a direction toward each other. The chuck moving mechanism 20 further includes a chuck supporting mechanism 22 and a chuck pressing mechanism 24. A chuck position detecting mechanism 26 (which will be described in detail later) is attached to the chuck moving mechanism 20.

Figure 4:
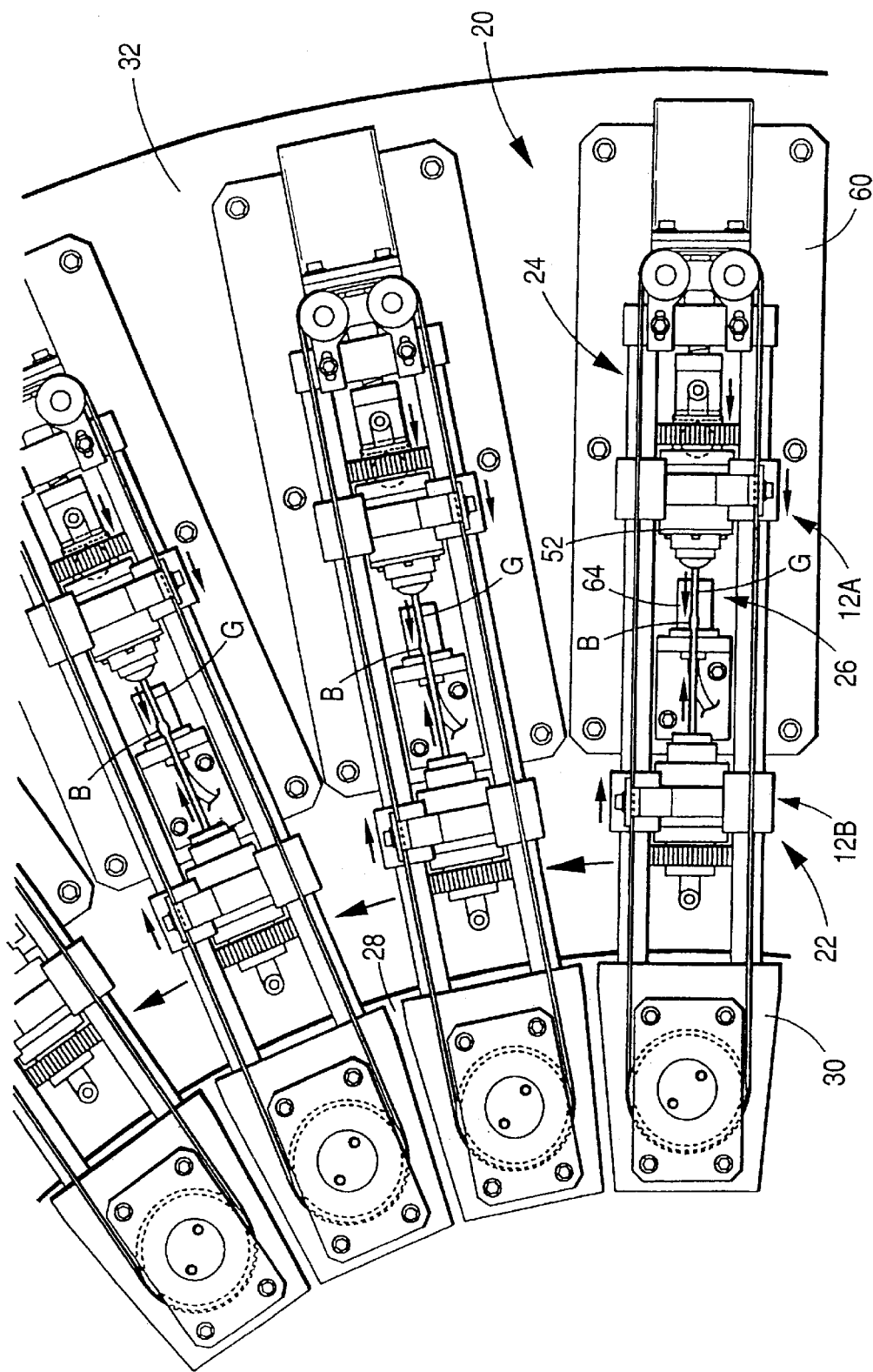
FIG. 4 is a plan view showing a part of an arc tube producing apparatus into which the chuck moving mechanism is incorporated.

As shown in FIG. 4, a chuck supporting mechanism 22 is attached to each one of a plurality of heads 30. The heads 30 are respectively disposed in index angle positions on an index table 28 that is intermittently rotated. A chuck pressing mechanism 24 is attached, via a base plate 60, to a stationary table 32 in each of several (for example, five) ones of the stations where the index table 28 stops. The approaching movement of the chucks 12A and 12B, caused by the chuck moving mechanism 20, is gradually performed in a stepwise manner in the several stations so that the gathering operation is gradually performed without unevenly deforming the intermediate portion A of the cylindrical glass tube blank G.

Referring again to FIGS. 1 and 2, the chuck supporting mechanism 22 includes: a pair of guide rods 34, which extend from the corresponding head 30 fixed to the index table 28, so as to protrude radially outward; and a rotary belt mechanism 36 which is disposed in the vicinity of and above the guide rods 34.

The guide rods 34 support the chucks 12A and 12B so that the chucks are slidable in a radial direction of the index table 28, which direction corresponds to the direction of the axis Ax of the cylindrical glass tube blank G.

The rotary belt mechanism 36 includes: a metal belt 38 made of stainless steel; a friction roller 40 which supports the metal belt 38 so that the belt can reciprocally run in a radial direction of the index table 28; and a pair of free rollers 42. The rotary belt mechanism 36 fixedly supports the chucks 12A and 12B, on opposed moving portions of the metal belt 38, so that the chucks 12A and 12B can be moved in opposite directions.

The friction roller 40 includes a friction adjusting dial 40a, and is supported on the head 30. By operating the friction adjusting dial 40a, the friction roller 40 applies an appropriate resistance—due to a sliding friction force—to the running of the metal belt 38.

On the other hand, the pair of free rollers 42 are supported on a bracket 46 bolted onto an end-connecting member 44 which couples the end portions of the guide rods 34 to each other. A pair of oblong holes 46a are formed in the bracket 46 so that the positions of the free rollers 42 can be adjusted when the bracket 46 is bolted onto the end-connecting member 44. Looseness in the metal belt 38 can be eliminated by adjusting the position of bracket 46.

Next, the configuration of the chucks 12A and 12B will be described.

Each of the chucks 12A and 12B includes: a chuck main unit 12a which grips a corresponding end portion of the cylindrical glass tube blank G; a main-unit support 12b which supports the chuck main unit 12a so as to be rotatable about the axis Ax of the cylindrical glass tube blank G; a pair of sliding portions 12c which are fixed to an upper part of the main-unit support 12b, and which are slidably coupled to, and supported by, respective guide rods 34; a belt coupling portion 12d which is fixedly coupled to one of the opposed moving portions of the metal belt 38; a gear 12e which is fixed to the chuck main unit 12a, and which is coupled via a gear train (not shown) to a chuck rotation driving source (not shown); and a gas supply pipe 12f through which gas is supplied into the cylindrical glass tube blank G during blow molding.

The following members are additionally included on the chuck 12A which is positioned in an outer position, in a radial direction of the index table 28. Namely, a bracket 48 is fixed to a lower end portion of the main-unit support 12b, and a roller 50 is attached to the bracket 48 so as to be rotatable about a vertical axis. Further, in the main-unit support 12b, a position detection plate 52 is attached to the end face on the inner side—in a radial direction of the index table 28—of the chuck 12A so as to extend perpendicularly downward.

Next, the chuck pressing mechanism 24 will be described. The chuck pressing mechanism 24 includes a stepping motor 54, a screw feeding mechanism 56, and a pressing block 58.

The stepping motor 54 is driven and controlled by a controller which is not shown. Further, the stepping motor 54 is fixed via the base plate 60 to the stationary table 32, and the screw feeding mechanism 56 is coupled to the stepping motor 54. The pressing block 58 is an L-shaped member which is formed so that its upper end portion is positioned at substantially the same level as the roller 50. The pressing block 58 is attached to a movable portion 56a of the screw feeding mechanism 56. When the stepping motor 54 is driven, the pressing block 58 is moved—together with the movable portion 56a of the screw feeding mechanism 56—in a radial direction of the index table 28.

When the index table 28 rotates, the chuck pressing mechanism 24 moves the pressing block 58 outward to a position which is outwardly separated from the roller 50—in a radial direction of the index table 28—so as to prevent the block and the roller from interfering with each other. When the index table 28 is stopped, the chuck pressing mechanism inwardly moves the pressing block 58—in a radial direction of the index table 28—thereby causing the pressing block 58 to abut against the roller 50 so as to press the roller 50. As a result of this pressing, the chuck 12A is moved toward the other chuck 12B along the axis Ax. In accordance with the movement of chuck 12A, the belt 38 runs so that the chuck 12B—which is fixedly supported to an opposed moving portion of the belt—is moved in the opposite direction in an interlocked manner with the movement of the chuck 12A. As a result, the chucks 12A and 12B are moved by the same distance, in a direction along the axis Ax, toward each other.

The chuck position detecting mechanism 26 includes the position detection plate 52 and a laser position detector 64.

As described above, the position detection plate 52 is attached to the chuck 12A. The laser position detector 64 is attached to the base plate 60 via a bracket 62 so that the laser position detector 64 is directed outwardly in a radial direction of the index table 28. When the index table 28 is stopped, the laser position detector 64 is normally opposed to the position detection plate 52 but is separated therefrom by a predetermined distance.

The laser position detector 64 includes a light emitting device (laser diode) and a position detecting device is (PSD). The light emitting device emits a laser beam in a radially outward direction, and the position detecting device receives the laser beam as reflected by the position detection plate 52, whereby the position of the position detection plate 52 (i.e., the position of the chuck 12A) in the direction of the axis Ax is sequentially detected. A result of the detection is sent to the controller for the stepping motor 54.

Based on the position data of the chuck 12A, which are sent from the laser position detector 64, the controller for the stepping motor 54 calculates the approach distance of the chuck 12A. In the calculation of the approach distance, data regarding the initial position of the chuck 12A is necessary. The chuck position detecting mechanism 26 detects the initial position of the chuck 12A during a period from when the index table 28 stops until driving of the stepping motor 54 is started.

When the approach distance of the chuck 12A—which is calculated as described above—reaches a predetermined set value, the controller stops driving the stepping motor 54. The value which is twice the predetermined value equals the total approach distance of the chucks 12A and 12B in one station.

Next, the effects of the embodiment will be described.

In the above-described embodiment, the pair of chucks 12A and 12B, which grip the end portions of the cylindrical glass tube blank G, are moved by the chuck moving mechanism 20 toward each other so that glass of the intermediate portion A of the cylindrical glass tube blank G is gathered so as to form the intermediate portion B. During this process, the position of one of the chucks is detected by using the laser position detector 64, and a result of the detection is fed back to the chuck moving mechanism 20, so as to control the approach distances of the chucks 12A and 12B. Therefore, the embodiment can attain the following effects.

When the approach distance of the chuck 12A in one station is set to Da as shown in FIG. 3, a distance D1 by which the pressing block 58 must actually be moved is greater than Da (i.e., D1>Da) because of a gap between the pressing block 58 and the roller 50, deformation of the roller 50, deformation of the bracket 48, and so on. Furthermore, backlash may exist in the screw feeding mechanism 56, and the like. In order to actually move the pressing block 58 by the movement distance D1, therefore, the driving amount of the stepping motor 54 must be set to a movement distance Do which is obtained by adding the backlash to the movement distance D1 (i.e., Do>D1).

When the stepping motor 54 is drivingly controlled in an open loop or in a semi-closed loop based on the detection of the pressing block 58, as in the case of the conventional art, it is impossible to correctly move the chuck 12A by the set approach distance Da.

By contrast, when the position of the chuck 12A itself is detected by the laser position detector 64, as in the present invention, the driving of the stepping motor 54 can be controlled in a closed loop. Even when there is a gap between the pressing block 58 and the roller 50, the roller 50 is deformed, the bracket 48 is deformed, or there is backlash in the chuck pressing mechanism 24, therefore, the correct position of the chuck 12A can be fed back to the stepping motor's controller irrespective of such a gap, deformation, or backlash. As a result, the chuck 12A can be correctly moved by the set approach distance Da.

In the above-described embodiment, the one chuck 12A is pressed by the chuck pressing mechanism 24. When the chuck 12A is moved by this pressing, the other chuck 12B is moved in the opposite direction by the rotary belt mechanism 36 in an interlocked manner with the movement of chuck 12A. Hence, the chucks 12A and 12B can be moved by the same distance in a direction along which the chucks approach each other. Namely, in FIG. 3, the approach distance Db of the chuck 12B can be made substantially equal to the set approach distance Da of the chuck 12A.

Because the metal belt 38 is used in the rotary belt mechanism 36, elongation of the belt due to changes with age can be made much smaller than that in the case where a timing belt made of rubber or the like is used. Hence, loosening of the metal belt 38 can be effectively suppressed, and the approach distances of the chucks 12A and 12B can be maintained substantially equal for a long time.

As described above, in the present invention, the approach distances of the chucks 12A and 12B can be correctly controlled and, hence, the intermediate portion B—which is formed by the gathering operation on the cylindrical glass tube blank G—can be formed into a shape that is suitable for the subsequent blow molding step. Therefore, the light emitting tube portion 4a can be accurately formed, so that the optical quality of an arc tube is enhanced.

In the above-described embodiment, since the approaching movement of the chucks 12A and 12B is gradually performed in a stepwise manner by a plurality of stations, the gathering operation on the cylindrical glass tube blank G can be gradually performed. According to this configuration, it is possible to prevent the intermediate portion A from being deformed unevenly.

Furthermore, according to the present invention, the chuck position detecting mechanism 26 detects the initial position of the chuck 12A during the time when the head 30 of the index table 28 is stopped in a station in which the chuck pressing mechanism 24 is disposed, until the stepping motor 54 starts to be driven. Even when the gap between the pressing block 58 and the roller 50 is varied among the stations, the approach distances of the chucks 12A and 12B can be accurately controlled by setting as a reference the initial position of the chuck 12A which is detected before the chuck 12A is moved by the pressing block 58. Further, even when the approaching movement of the chucks 12A and 12B is stepwisely performed in plural stations, it is possible effectively to prevent the approach distances of the chucks 12A and 12B from deviating from a desired value.

In the above-described embodiment, the laser position detector 64 detects the position of only one chuck 12A. Yet when the position of both the chucks 12A and 12B is detected, the approach distances of the chucks 12A and 12B can be controlled more correctly. When such increased accuracy is desired, the position of each chuck 12A, 12B is directly detected in a manner similar to that described above for detecting the position of one chuck. Even when a timing belt made of rubber or the like, in which loosening easily occurs, is used as the rotary belt mechanism 36 (i.e., in place of the metal belt 38 in the above-described embodiment), the total approach distance of the chucks 12A and 12B can be correctly calculated without being affected by looseness in the belt.

It is contemplated that numerous modifications may be made to the method of producing an arc tube of the present invention without departing from the spirit and scope of the invention as defined in the following claims.

What is claimed is:

1. A method of producing an arc tube in which, in a process of producing an arc tube including a light emitting tube portion having a substantially elliptical spherical shape, said light emitting tube portion is formed in an intermediate portion of a cylindrical glass tube blank, said method comprising:

rotating said cylindrical glass tube blank while gripping end portions of said cylindrical glass tube blank with chucks;

heating a vicinity of said intermediate portion of said cylindrical glass tube blank to soften said intermediate portion;

moving said chucks, by a chuck moving mechanism, a predetermined distance toward each other, thereby gathering softened glass in the intermediate portion; and expanding said intermediate portion by blow molding into a substantially elliptical spherical shape, wherein the step of moving said chucks further includes detecting a position of at least one of said chucks by using a position detector, and the method further includes feeding a result of the detection back to said chuck moving mechanism to control an approach distance of said chucks.

2. A method of producing an arc tube according to claim 1, wherein said chuck moving mechanism includes a rotary belt having opposed moving portions on which said chucks are respectively fixedly supported, and wherein said method further includes pressing, with a chuck pressing mechanism, one of said chucks that is fixedly supported to said belt.

3. A method of producing an arc tube according to claim 2, wherein said belt is a metal belt.

4. A method of producing an arc tube according to claim 2, wherein said step of moving said chucks is performed in a stepwise manner by a plurality of stations, each of said stations including a position detector, and the method further includes detecting, with each of said position detectors, an initial position of said at least one chuck during a period from when the at least one chuck enters one of said plurality of stations, to a start of the pressing step.

5. A method of producing an arc tube according to claim 3, wherein said step of moving said chucks is performed in a stepwise manner by a plurality of stations, each of said stations including a position detector, and the method further includes detecting, with each of said position detectors, an initial position of said at least one chuck during a period from when the at least one chuck enters one of said plurality of stations, to a start of the pressing step.

* * * * *